April 29, 1930.  W. P. REED  1,756,662
METHOD OF AND APPARATUS FOR COOKING CANDY
Filed Dec. 5, 1929
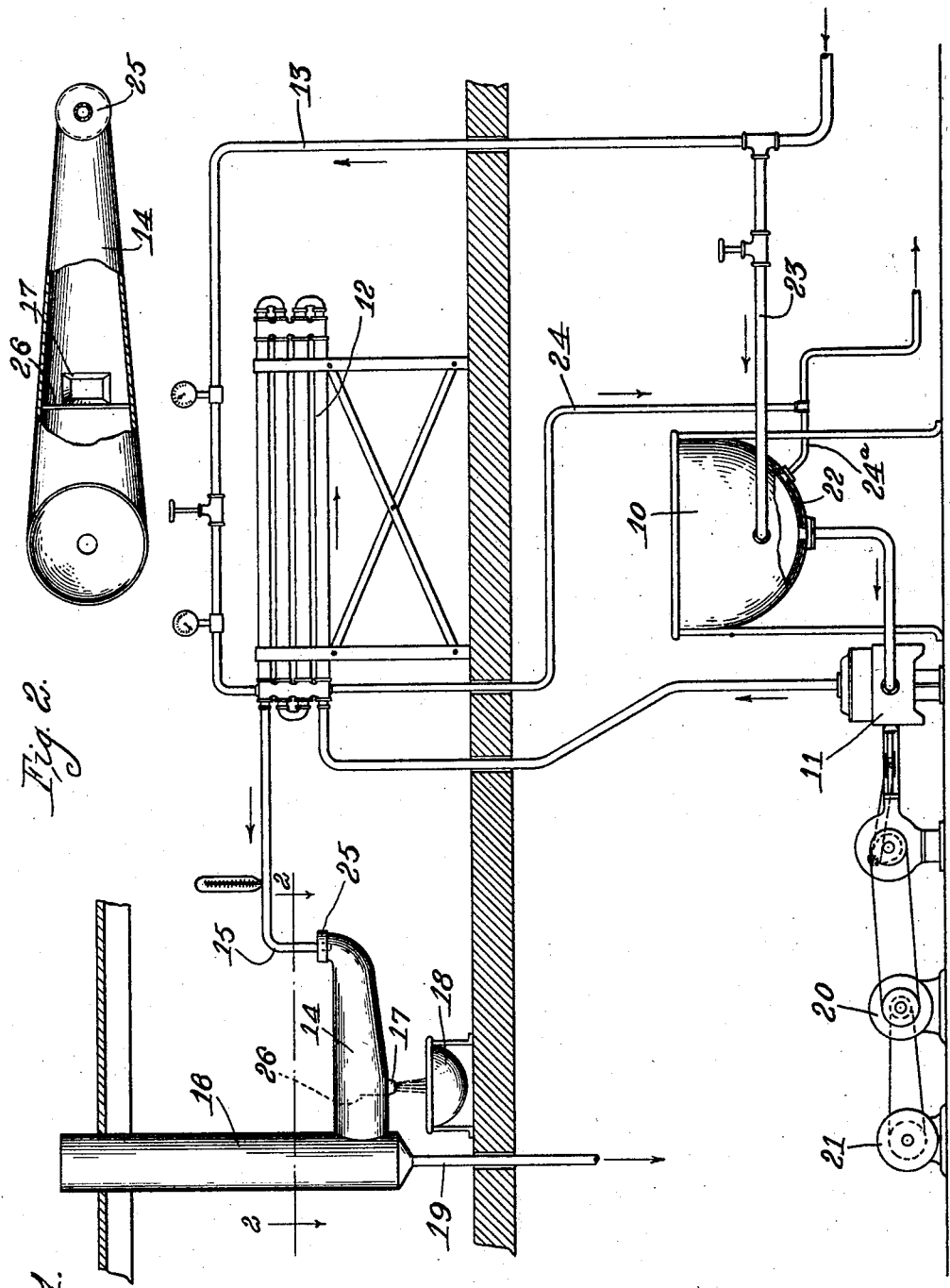
Inventor.
William P. Reed.
By Dyrenforth, Lee, Chritton and Wiles
Attys.

Patented Apr. 29, 1930 1,756,662

UNITED STATES PATENT OFFICE

WILLIAM P. REED, OF CHICAGO, ILLINOIS

METHOD OF AND APPARATUS FOR COOKING CANDY

Application filed December 5, 1929. Serial No. 411,869.

This invention relates to improvements in method of and apparatus for cooking candy.

Among the features of my invention is the provision of a method and means for cooking or making candy by a continuous process.

By the use of my invention, a high degree of efficiency is obtained and a superior product produced.

Another feature of my invention is the provision of an improved separating device for removing steam from the cooked material. This device operates quietly and with practically no waste.

Other features and advantages will appear more fully as I proceed with my specification.

In that form of apparatus shown in the accompanying drawings for practicing my improved method, Figure 1 is a view in side elevation and partly in section, and Fig. 2 is a view taken as indicated by the line 2 of Fig. 1.

As shown in the drawings, numeral 10 indicates a kettle in which the mixed ingredients are first placed. This kettle may be warmed by steam, if desired, and it is to be understood that no substantial amount of cooking takes place in this kettle. Numeral 11 indicates a pump for pumping the material from the kettle upwardly to the coil cooker above. This pump is preferably of the piston type with double acting valves and a slow speed pump in order to give a desired flow against varying pressures.

The coil cooker above, indicated by 12, consists of a coil for the candy material to flow through, such coil being surrounded by a steam jacket. This heated coil arrangement is similar to a condenser of well known type. Steam is supplied to the outer pipe through the steam pipe 13, as shown.

Upon leaving the coil cooker, the candy, which is now cooked, flows into the device 14 which is a separator. The principal purpose of this device 14 is to remove the steam from the candy and take it away before it condenses and flows back into the candy. It is to be understood that the steam that is taken off through the device 14 is not any of the steam coming through the pipe 13 that is used for the cooking. The steam that is removed through the device 14 is the moisture that is cooked out of or cooked off of the candy during the cooking process. That is, there is a mixture of steam and cooked candy issuing or spitting from the discharge pipe 15 of the coil cooker. The steam is taken off through the steam exhaust 16 before it condenses and the candy flows out through the outlet 17 into the receiver 18. Any condensation of steam that occurs in the steam exhaust 16 escapes through the drain pipe 19.

Numeral 20 indicates a variable speed-reducing gear driven by a motor 21, the former being adjustable to give the desired pump speed.

The steam jacket on the kettle 10 is indicated by 22 and steam may be supplied to the same from the steam pipe 23. 24 and 24ᵃ indicate steam returns from the cooking coil 12 and kettle 10, respectively.

A plan view of the separator 14 is shown in Fig. 2. It will be seen that this separator includes an elongated tapered casing with a discharge spout or outlet 17 in the bottom near the larger end. The smaller end is turned upwardly to receive the end of the discharge pipe 15 from the cooking coil and a perforated cover 25 is preferably provided to confine any steam that might otherwise escape at this point. The steam-laden candy may be discharged from the pipe 15 with considerable force and the escaping steam may cause considerable sputtering and bubbling. All loss of candy is prevented, however, by the casing 14; and the same is enlarged toward the outlet end to permit the necessary expansion of the material as it is discharged from the pipe 15. As the steam separates, the candy settles to the bottom of the casing 14 and flows down to and out of the discharge spout 17. 26 indicates a vertical baffle or dam arranged just beyond the discharge spout 17 to stop the flow of any candy at that point and direct it into the outlet. The separated steam passes over the dam 26 and escapes through the chimney or flue 16, any condensation flowing downwardly through the pipe 19.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new, and desire to secure by Letters Patent, is:

1. The method of cooking candy by a continuous process including, mixing the ingredients, forcing the same through a heated cooking coil, and discharging the same into a separator permitting escape of the steam generated in the candy and directing the cooked candy into a receiver.

2. The method of cooking candy by a continuous process including, mixing the ingredients, forcing the same through a steam heated cooking coil, and discharging the same into a separator permitting escape of the steam generated in the candy and directing the cooked candy into a receiver.

3. Apparatus for cooking candy including; a heated cooking coil; a receptacle for the mixed ingredients; means for forcing the mixed ingredients from said receptacle through said coil to cook the same, and a separator to receive the cooked candy issuing from the coil, said separator permitting escape of the steam generated in the candy while in the cooking coil.

4. Apparatus for cooking candy including; a steam heated cooking coil; a receptacle for the mixed ingredients; means for forcing the mixed ingredients from said receptacle through said coil to cook the same; and a separator to receive the cooked candy issuing from the coil, said separator permitting escape of the steam generated in the candy while in the cooking coil.

In testimony whereof, I hereunto set my hand this 29th day of November, 1929.

WILLIAM P. REED.